US012155786B2

(12) United States Patent
Zheng

(10) Patent No.: US 12,155,786 B2
(45) Date of Patent: Nov. 26, 2024

(54) IMAGE-BASED DETECTION OF MODEM CRASHES IN MOBILE TELEPHONIC DEVICES

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 350 days.

(21) Appl. No.: 17/553,656

(22) Filed: Dec. 16, 2021

(65) Prior Publication Data
US 2023/0199099 A1 Jun. 22, 2023

(51) Int. Cl.
H04M 1/24 (2006.01)
G06N 20/00 (2019.01)
G06V 10/20 (2022.01)
G06V 10/70 (2022.01)
H04B 17/23 (2015.01)
H04M 1/72454 (2021.01)

(52) U.S. Cl.
CPC ............ H04M 1/24 (2013.01); G06N 20/00 (2019.01); G06V 10/255 (2022.01); G06V 10/768 (2022.01); H04B 17/23 (2015.01); H04M 1/72454 (2021.01); G06V 2201/02 (2022.01); H04M 2250/68 (2013.01)

(58) Field of Classification Search
CPC .......... G06N 20/00; G06N 3/08; G06N 3/091; G06N 3/096; G06N 5/022; H04W 76/25; H04W 76/18; H04W 52/223; H04W 24/08; H04W 16/22; H04W 28/0967; H04W 36/30
See application file for complete search history.

(56) References Cited

U.S. PATENT DOCUMENTS

| | | | |
|---|---|---|---|
| 2019/0200244 A1* | 6/2019 | Polepalli | G06N 20/00 |
| 2019/0268779 A1* | 8/2019 | Peroulas | H04W 16/00 |
| 2020/0213875 A1* | 7/2020 | Seol | H04W 24/02 |
| 2021/0248618 A1* | 8/2021 | Ionescu | G06Q 30/016 |
| 2022/0029892 A1* | 1/2022 | Hooli | H04W 24/02 |

FOREIGN PATENT DOCUMENTS

| | | |
|---|---|---|
| CN | 100431372 C | 11/2008 |
| CN | 101742716 A | 6/2010 |
| CN | 101754257 B | 9/2012 |
| CN | 104219736 A | 12/2014 |
| CN | 104660321 A | 5/2015 |
| CN | 104661280 A | 5/2015 |

(Continued)

Primary Examiner — Kwasi Karikari
(74) Attorney, Agent, or Firm — Perkins Coie LLP

(57) ABSTRACT

To detect "silent" crashes of communications processors in a mobile device, the mobile device analyzes signal strength icon images using a trained image processing model. During operation of a mobile device, the device captures images of a signal strength icon that is displayed by the device and that visually represents a telecommunications signal strength detected by the mobile device. The mobile device applies the captured images to the trained image processing model, which is configured to output a prediction of whether the communications processor in the mobile device crashed.

20 Claims, 7 Drawing Sheets

(56) References Cited

FOREIGN PATENT DOCUMENTS

| | | |
|---|---|---|
| CN | 104754064 A | 7/2015 |
| CN | 102164368 B | 9/2016 |
| CN | 103327526 B | 7/2017 |
| CN | 104468559 B | 7/2017 |
| CN | 111193563 A | 5/2020 |
| CN | 110290156 B | 9/2021 |
| DE | 112006001710 T5 | 5/2008 |
| DE | 102004001172 B4 | 11/2012 |
| DE | 102016004256 A1 | 10/2016 |
| EP | 1589772 A1 | 10/2005 |
| EP | 1606958 A2 | 12/2005 |
| EP | 1634393 A1 | 3/2006 |
| EP | 1155515 B1 | 7/2006 |
| EP | 1617603 B1 | 5/2008 |
| EP | 2837255 A1 | 2/2015 |
| EP | 2907353 A1 | 8/2015 |
| EP | 3155867 A1 | 4/2017 |
| EP | 1279235 B1 | 10/2017 |
| EP | 3311507 A1 | 4/2018 |
| EP | 3504900 A1 | 7/2019 |
| EP | 2730056 B1 | 8/2019 |
| EP | 3322207 B1 | 1/2020 |
| EP | 3335466 B1 | 1/2020 |
| EP | 2727435 B1 | 2/2020 |
| EP | 2620028 B1 | 4/2020 |
| EP | 3735049 A1 | 11/2020 |
| KR | 100418877 B1 | 2/2004 |
| KR | 100621329 B1 | 9/2006 |
| KR | 100719613 B1 | 5/2007 |
| KR | 100753837 B1 | 8/2007 |
| WO | 03043358 A1 | 5/2003 |
| WO | 2005032083 A1 | 4/2005 |
| WO | 2007062326 A2 | 5/2007 |
| WO | 2007078663 A2 | 7/2007 |
| WO | 2008078206 A2 | 7/2008 |
| WO | 2010045302 A1 | 4/2010 |
| WO | 2010102149 A2 | 9/2010 |
| WO | 2012019317 A1 | 2/2012 |
| WO | 2012161511 A2 | 11/2012 |
| WO | 2014028395 A1 | 2/2014 |
| WO | 2014164774 A1 | 10/2014 |
| WO | 2015155411 A1 | 10/2015 |
| WO | 2018125686 A2 | 7/2018 |
| WO | 2018226486 A1 | 12/2018 |
| WO | 2019027776 A1 | 2/2019 |
| WO | 2019029668 A1 | 2/2019 |
| WO | 2019168600 A1 | 9/2019 |
| WO | 2020151468 A1 | 12/2020 |
| WO | 2020248430 A1 | 12/2020 |
| WO | 2021030331 A1 | 2/2021 |

\* cited by examiner

IMAGE-BASED DETECTION OF MODEM CRASHES IN MOBILE TELEPHONIC DEVICES

BACKGROUND

Mobile devices typically include at least two processors: an application processor and a communications processor. The communications processor facilitates receipt and transmission of telecommunications signals, for example by modulating signals for transmission from the mobile device and demodulating signals received at the mobile device. The application processor performs general-purpose processing functionality of the mobile device, including operating software applications on the device, generating user interfaces, processing inputs from users, and communicating with the communications processor to receive and transmit data via telecommunications signals.

At times, the communications processor in a mobile device undergoes temporary, short-lived crashes where it is unable to process incoming or outgoing signals. These "silent crashes" can affect performance of a mobile device by, for example, interrupting data transmissions, introducing latency, or causing telephone calls to drop. Such crashes can have any of a variety of causes, including bugs in software executed by the communications processor or incorrectly handled conditions introduced by communication between the application processor and the communications processor. However, detecting silent crashes can be difficult because they often last only a short period of time and because an external device typically does not have access to data associated with a state of the communications processor at the time of the crash. Additionally, as 5th Generation (5G) devices are developed and increasingly complex features are deployed at ever-growing rates, it has become more challenging to thoroughly test mobile devices to limit the incidence of communications processor crashes. Thus, there is a need for a mechanism to identify silent crashes of communications processors.

BRIEF DESCRIPTION OF THE DRAWINGS

Detailed descriptions of implementations of the present invention will be described and explained through the use of the accompanying drawings.

Figure 1:
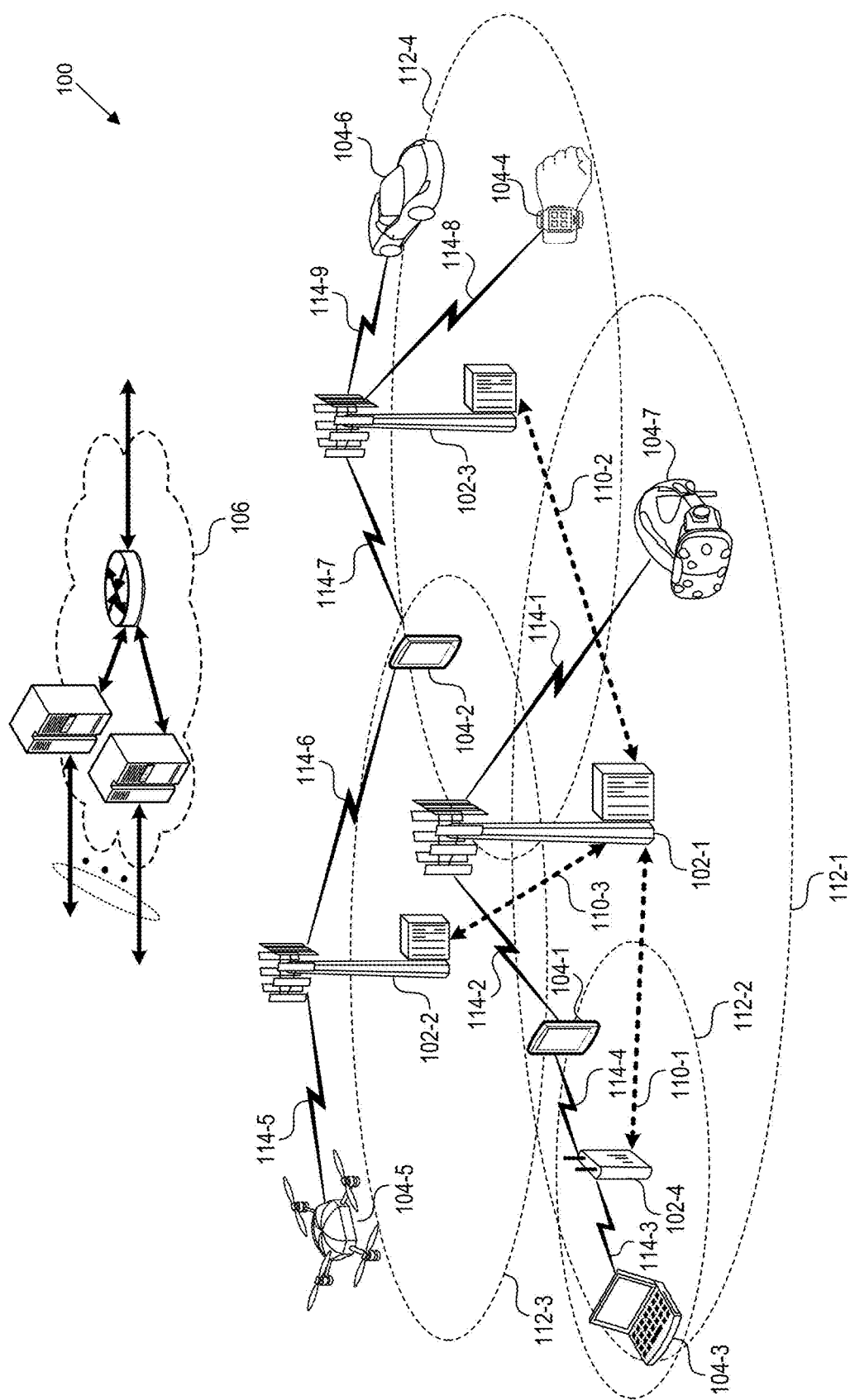
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Silent crashes of communications processors affect performance and reliability of mobile telephonic devices. However, it is difficult for telecommunication providers to detect these temporary interruptions to a device's network communications—much less diagnose the cause the of the crash. Thus, the inventors have invented and reduced to practice a mechanism to detect silent communications processor crashes by analyzing signal strength indicators (e.g., signal strength icon images) using a trained image processing model. During operation of a mobile device, the device captures images or videos of a signal strength icon that is displayed by the device and that visually represents a telecommunications signal strength detected by the mobile device. The mobile device applies the captured images to the trained image processing model, which is configured to output a prediction of whether the communications processor in the mobile device crashed.

The image processing model is a universal model that can be used by any mobile telephonic device to detect communications processor crashes, regardless of the manufacturer of the device, the type of device, the operating system on the device, or any modifications applied by the end user. When a communications processor crash is detected, the mobile devices can record state data associated with a context of the crash, such as information about the telecommunications network and the status of the device at and preceding the time of the crash. This state data can be anonymized and aggregated by a remote system, such as a system operated by a telecommunications provider, for use by the remote system to track the reliability of certain mobile devices or certain software releases, or to otherwise identify factors that cause silent crashes. Furthermore, the state data can be used to retrain the image processing model to continually improve the ability of the model to detect communications processor crashes. In some implementations, the image processing model applied on a mobile device is supplemented with models that account for the state data or signal strength measurements when predicting crashes of the communications processor in the mobile device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, a mobile device, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
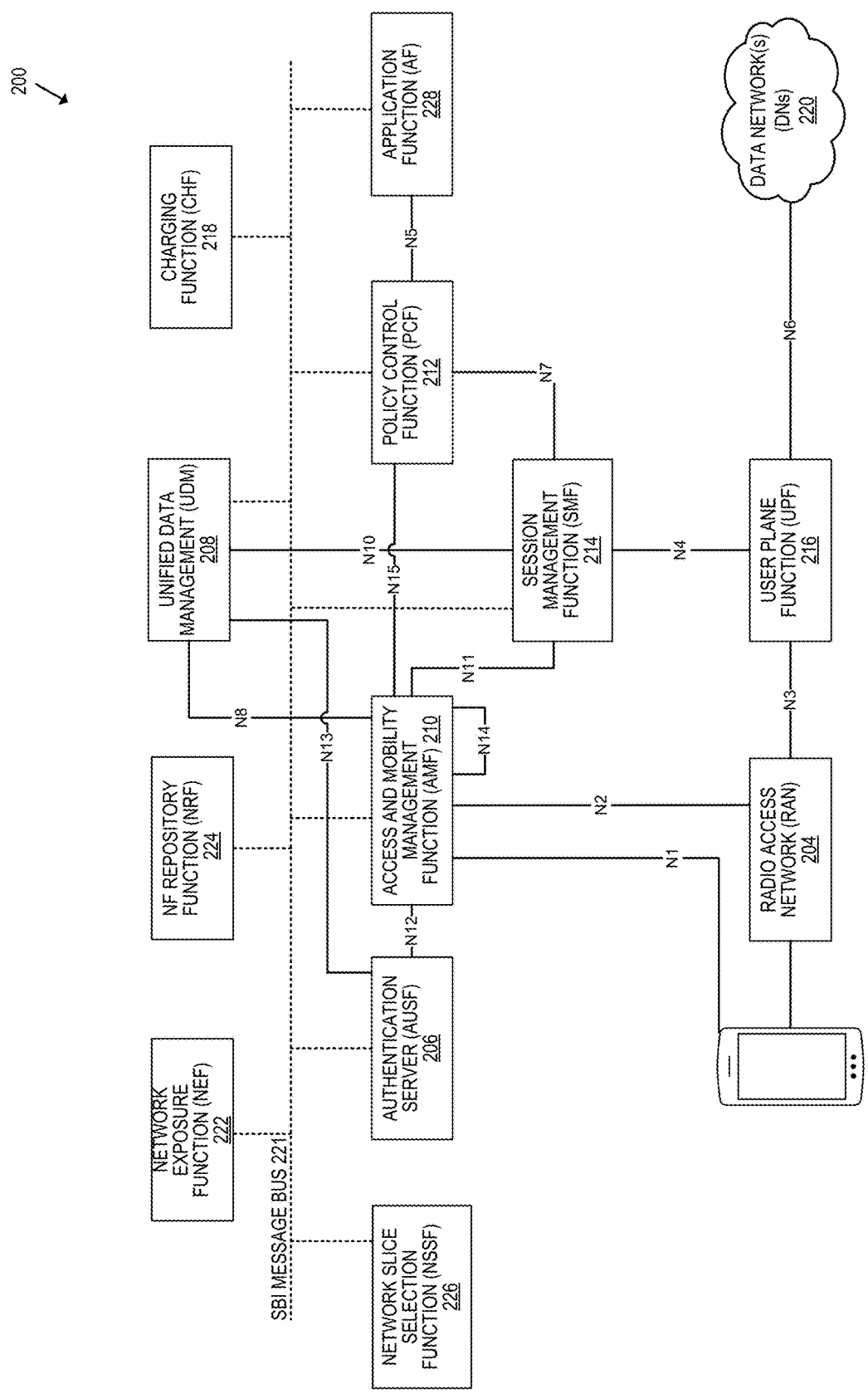
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Mobile Device Crash Detection

Figure 3:
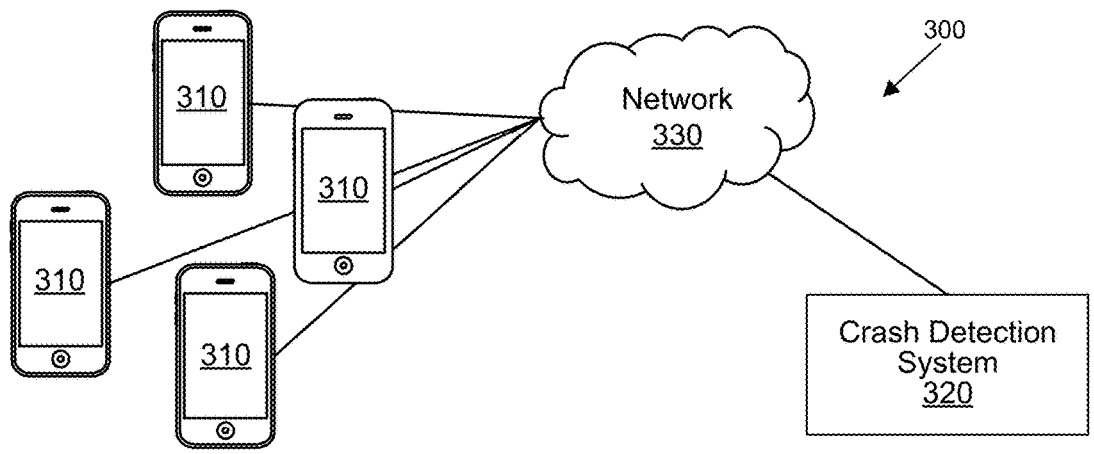
FIG. 3 is a block diagram illustrating an environment in which communications processor crashes are detected.

As described above, mobile devices operating on a telecommunications network, including a 5G network, experience occasional silent communications processor crashes. FIG. 3 is a block diagram illustrating an environment 300 in which communications processor crashes are detected. As shown in FIG. 3, the environment 300 can include a plurality of mobile devices 310 and a crash detection system 320, in communication over a network 330.

The mobile devices 310 are devices that are capable of communicating with other devices via a telecommunications network. The environment 300 can include a variety of types of mobile devices 310, devices produced by different manufacturers, and different models of devices. The mobile devices 310 each include a communications processor, such as a modem, to facilitate wireless telecommunications to and from the device. During operation of each mobile device 310, the communications processor occasionally crashes, or experiences a temporary failure that affects the communications processor's ability to receive or transmit communications for a short period of time. These "silent crashes" of the communications processor can have any of a variety of causes, such as problems in the software executed by the communications processor, or problems arising from communication between the communications processor and an application processor in the mobile device (such as conditions that the communications processor does not correctly handle).

To detect silent crashes of a communications processor, the mobile devices 310 use a trained image processing model to analyze a signal strength icon that visually depicts a strength of a telecommunications signal received at the mobile device. The signal strength icon is an icon generated by and displayed on a display device of each mobile device 310 based on measurements of the telecommunications signal strength. As the signal strength changes, the mobile device 310 modifies the appearance of the signal strength icon to reflect the current signal strength at any given time. Different types of the mobile devices 310 can represent the signal strengths in different ways, and the signal strength icon can appear at different locations on the displays of different devices. The trained image processing model is configured to receive a set of signal strength indicators from any type of mobile device 310 and predict communications processor crashes based on the set of images. Although implementations herein are described using signal strength icon images as an example of the signal strength indicators, various other implementations can instead employ other types of signal strength indicators, such as video clips, sets of video clips, or sets including a combination of individual images and videos.

The crash detection system 320 trains the models used by the mobile devices 310 to detect communications processor crashes. The crash detection system 320 receives signal strength icon images from multiple different types of the mobile devices 310 and uses the received signal strength icon images as training data for a universal model that can be used by any type of mobile device to detect crashes.

A "model," as used herein, refers to a construct that is trained using training data to make predictions or provide probabilities for new data items, whether or not the new data items were included in the training data. For example, training data for supervised learning can include various sets of signal strength icon images and a label classifying each set as to whether it coincided with a communications processor crash. A new data item (such as a new set of signal strength icon images) can have parameters that a model can use to assign a classification to the new data item. As another example, a model can be a probability distribution resulting from the analysis of training data, such as a likelihood of a communications processor crash occurring based on an analysis of a large number of signal strength icon images captured from mobile devices. Examples of models include: neural networks, support vector machines, decision trees, Parzen windows, Bayes clustering, reinforcement learning, probability distributions, decision trees, decision tree forests, and others. Models can be configured for various situations, data types, sources, and output formats.

In some implementations, the image processing model can be a neural network with multiple input nodes that receive an input data point or signal, such as a sequence of signal strength icon images captured by a mobile device 310 or state data describing a context in which signal strength icon images were captured. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to predict a crash of a communications processor. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes inputs and desired outputs. Inputs can include, for example, sets of signal strength icon images that illustrate a sequential progression of a signal strength indicator known to coincide with modem crashes, sets known to not coincide with modem crashes, and/or state data identifying a context of a mobile device at the time the signal strength icon images in the training data set were captured. The outputs used for training can include classifier labels applied to the input training data that identify whether a modem crash corresponded to each portion of the input training data. A representation of a wireless device's signal strength icons during a known modem crash can be provided to the model. Output from the model can be compared to the desired output and, based on the comparison, the model can be modified, such as by changing weights between nodes of the neural network or parameters of the functions used at each node in the neural network (e.g., applying a loss function). After applying each of the data points in the training data and modifying the model in this manner, the model can be trained to evaluate new data points (such as new sequences of signal strength icon images) to generate outputs that assess the likelihood of a communications processor crash.

In some implementations, the image processing model described herein is a single model (such as a deep neural network) that takes signal strength icon images as inputs and generates a likelihood of a communications processor crash as an output. In other implementations, the image processing model represents a set of multiple models that together take combinations of signal strength icon images and state data as inputs. For example, the image processing model can include multiple models that operate in an ensemble to produce outputs indicating the likelihood of communications processor crashes.

The network 330 enables communication between the mobile devices 310 and the crash detection system 320, and includes any of a variety of individual connections via the internet such as cellular or other wireless networks, such as 4G networks, 5G networks, or WiFi. In some embodiments, the network may connect terminals, services, and mobile devices using direct connections such as radio-frequency identification (RFID), near-field communication (NFC), Bluetooth™, low-energy Bluetooth™ (BLE), WiFi™, ZigBee™' ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network may comprise any type of computer networking arrangement used to exchange data. For example, the network may be the Internet, a private data network, virtual private network using a public network, and/or other suitable connection(s) that enables components in system environment 100 to send and receive information between the components of system environment 100. The network 330 may also include a public switched telephone network ("PSTN") and/or a wireless network.

Mobile Telephonic Device

Figure 4:
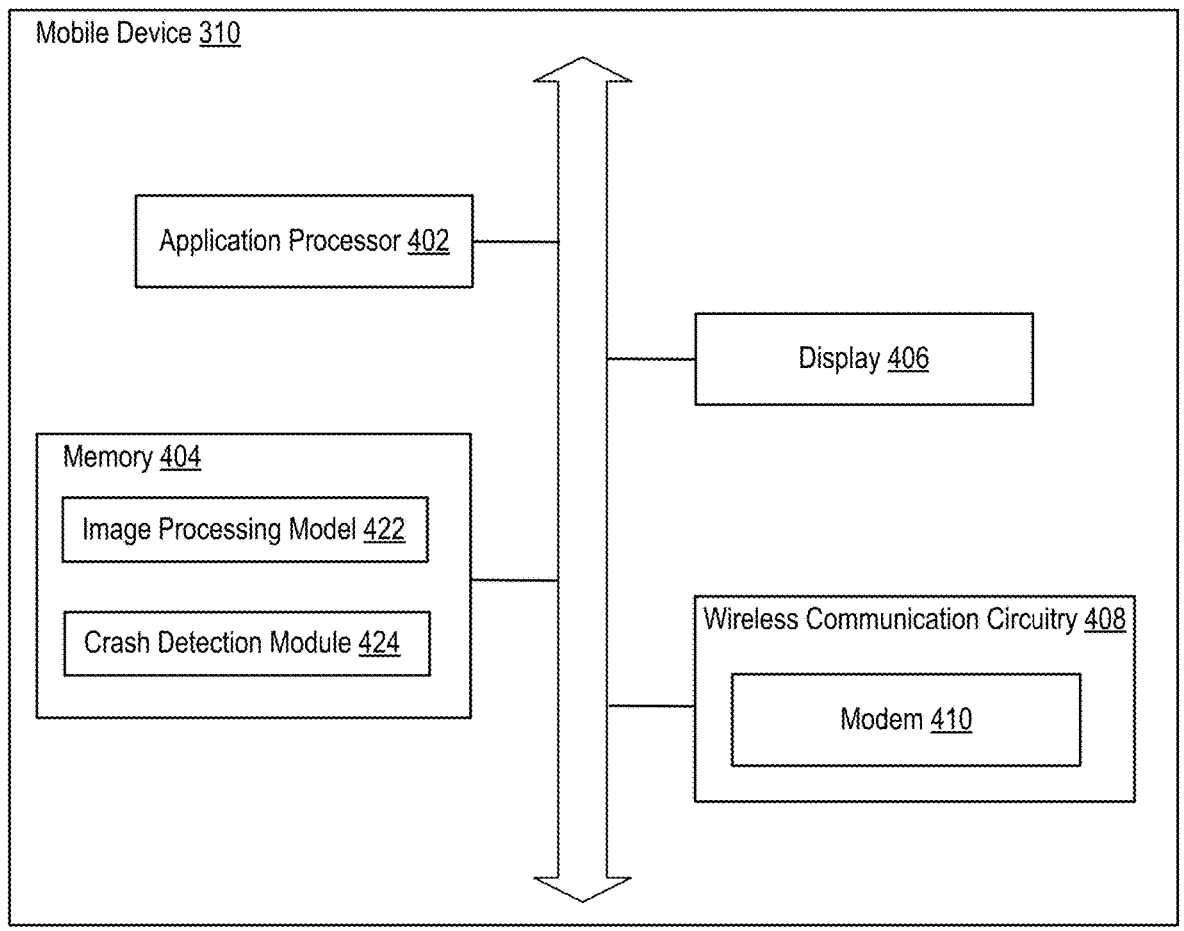
FIG. 4 is a block diagram that illustrates components of a mobile telephonic device.

FIG. 4 is a block diagram that illustrates components of a mobile telephonic device 310. The components shown in FIG. 4 are merely illustrative and well-known components are omitted for brevity. As shown, the mobile telephonic device 310 includes an application processor 402, a memory 404, a display 406, and wireless communication circuitry 408 including a modem 410. The application processor 402 can have generic characteristics similar to general-purpose processors, or the application processor 402 may be an application-specific integrated circuit (ASIC) that provides arithmetic and control functions to the computing device 400. While not shown, the application processor 402 may include a dedicated cache memory. The application processor 402 can be coupled to all components of the mobile device 310, either directly or indirectly, for data communication.

An example of the display 406 includes a touch-enabled display or a non-touch-enabled display, in which case the mobile device 310 likely also includes (or is connected to) an input device such as a keyboard. The wireless communication circuitry 408 forms and/or communicates with a network for data transmission among computing devices, such as personal computers, mobile phones, and computer servers. The wireless communication circuitry 408 can be used for communicating with these computing devices or for connecting to a higher-level network (e.g., a LAN) or the Internet. The wireless communication circuitry 408 includes a communications processor (e.g., a modem) 410 that facilitates receiving or transmitting data over a telecommunications network. For example, the modem modulates signals for transmission from the mobile device and demodulates signals received at the mobile device. The wireless circuitry 408 can include other components necessary for transmitting or receiving data via a telecommunications network, such as a radio transceiver, a power amplifier, or audio and/or video codecs. Furthermore, some implementations of the wireless communication circuitry 408 include circuitry and processors to facilitate other types of wireless communications, such Bluetooth, Z-Wave, ZigBee, or near field communication (NFC). The wireless communication circuitry 408 can output measurements of a strength of a telecommunications signal received at the mobile device 310 via an API. The application processor 402 uses these signal strength measurements to generate the signal strength icon images for display on the display 406.

The memory 404 can include any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the application processor 402, the memory 404 can also store data generated by the application processor 402 (e.g., when capturing images of signal strength icons or when collecting data to execute or improve a crash detection model). The memory 404 is merely an abstract representation of a storage environment. Hence, in some embodiments, the memory 404 is comprised of one or more actual memory chips or modules.

The memory 404 stores instructions that can be executed by the application processor 402 as well as data that can be used by the application processor 402 to perform various tasks. As shown in FIG. 4, the memory 404 can store at least an image processing model 422 and a crash detection module 424. The image processing model 422 is a model that, when applied by the application processor 402 to signal strength icon images, enables the application processor to output a likelihood that the communications processor 410 crashed. For example, the image processing model 422 is a model trained by the crash detection system 320, periodically updated in the memory 404 as the crash detection system 320 retrains and improves the model. The crash detection module 424 includes instructions that cause the application processor 402 to invoke the image processing model 422. The crash detection module 424 is configured to capture images or videos of signal strength indicators, for example by capturing screenshots on a periodic, on-demand, or random basis. At least some of the images or videos captured by the crash detection module 424 are at least temporarily stored in the memory 404. For convenience, the crash detection module 424 may be referred to as a computer program that resides within the memory 404. The term "module" refers broadly to software components, firmware components, and/or hardware components. Accordingly, the crash detection module 424 could be comprised of software, firmware, and/or hardware components implemented in, or accessible to, the mobile device 310.

Figure 5A:
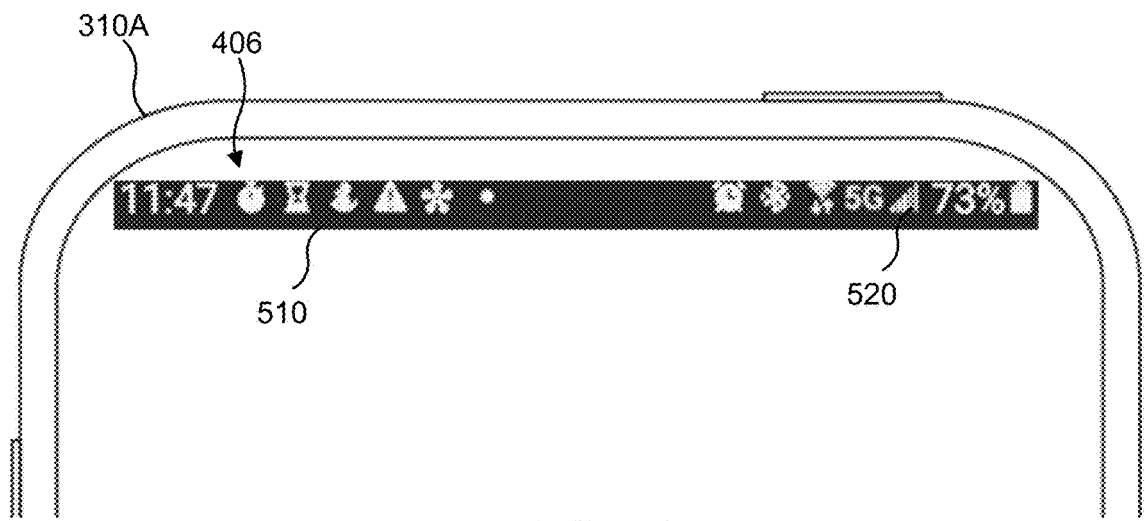
FIGS. 5A-5C illustrate example signal strength icon images displayed by a mobile device.
Figure 5B:
Figure 5C:
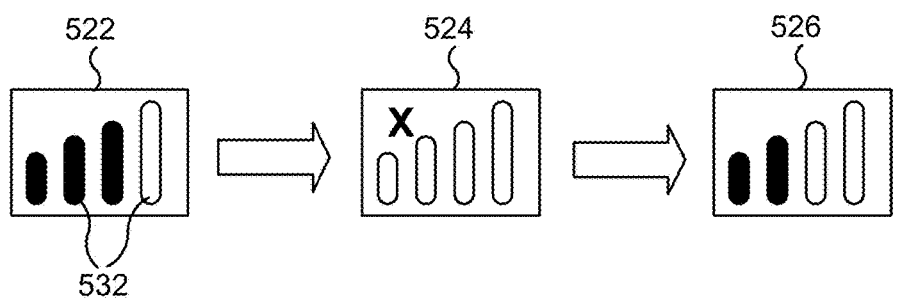

FIGS. 5A-5C illustrate example signal strength icon images displayed by a mobile device 310. FIG. 5A shows a partial display 406 of a first example mobile device 310A. Within a portion of the display 406, such as at a top region of the display, the mobile device 310A renders a status bar 510 that contains high-level information about a status of the device. For example, the status bar 510 displays a current time, notifications from applications executing on the mobile device 310A, and a current battery charge level of the device. In addition, the status bar 510 includes a signal strength icon 520 that visually represents a cellular network signal strength. FIG. 5B similarly illustrates a partial display 406 of another example mobile device 310B, showing a different example configuration of the status bar 510 and the signal strength icon 520. The status bar 510 can generally be displayed persistently when the display 406 is active, although some applications may use a "full-screen" mode that hides the status bar when in use.

FIG. 5C illustrates an example sequence of appearances of the signal strength icon 520. In the example shown in FIG. 5C, the signal strength icon 520 represents the cellular signal strength using four bars 532, where different numbers of the bars 532 are displayed in an active state (e.g., filled) or an inactive state (e.g., not filled) to represent different levels of signal strength. At a first time 522, the signal strength icon 520 indicates a moderately strong cellular signal, with three bars 532 filled. At a second time 524, the signal strength icon 520 changes to an appearance indicating that no cellular signal is detected. For example, the signal strength icon depicts all of the bars as not filled and displays an "X" near or overlapping with some of the bars when a cellular signal is not detected. At a third time 526, the signal strength icon 520 indicates a moderately weak cellular signal. If the progression shown in FIG. 5C occurs during a short period of time, such as a few seconds, it may be indicative of a communications processor crash. The image processing model 422 applied by the mobile device 310 can identify progressions of the appearance of the signal strength icon—including changes in the appearance and the amount of time between each change in appearance—that are likely to indicate a crash of the communications processor.

Training an Image Processing Model to Detect Modem Crashes

Figure 6:
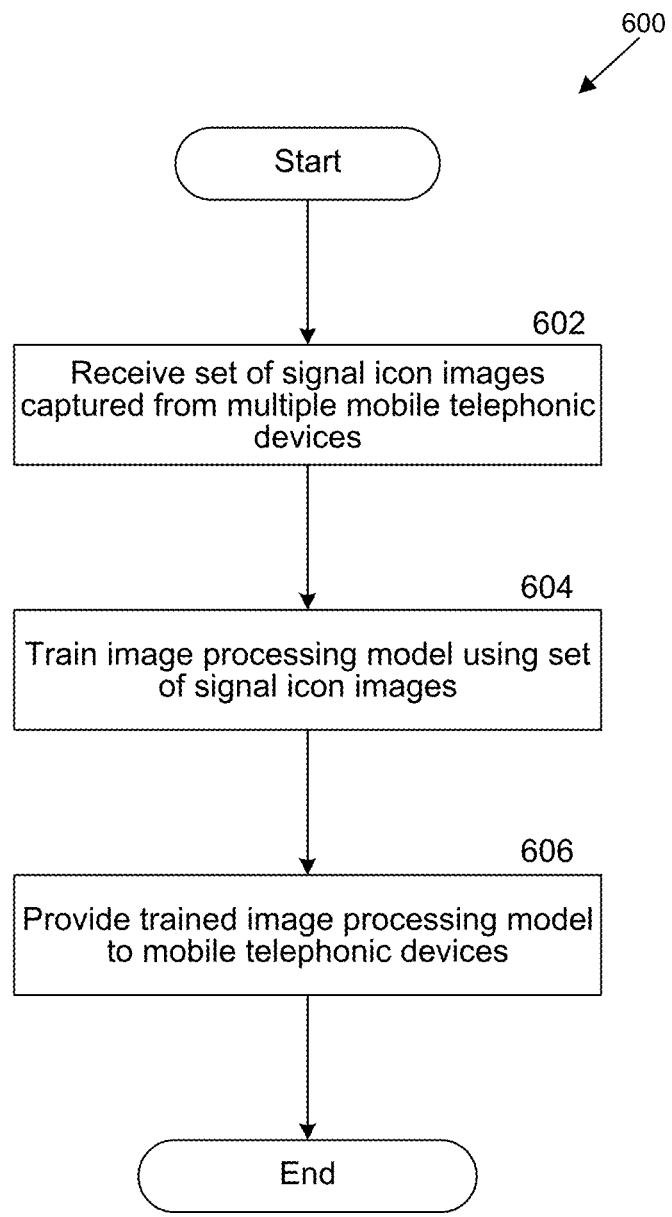
FIG. 6 is a flowchart that illustrates a process for training an image processing model to detect silent crashes of communications processors on mobile devices.

FIG. 6 is a flowchart that illustrates a process 600 for training an image processing model to detect silent crashes of communications processors on mobile devices. The process 600 can be performed by the crash detection system 320. Other implementations of the process 600 can include additional, fewer, or different steps, or can perform the steps in different orders.

At block 602, the crash detection system 320 receives a set of signal strength icon images captured from a plurality of mobile telephonic devices. Each signal strength icon image is a visual representation of a signal strength of a telecommunications signal at the time the image was captured. The set of images received by the crash detection system 320 can include multiple images from each device in order to capture the appearance of the signal strength icon for multiple different signal strengths. For example, if the signal strength icon on a particular mobile device has a maximum of four bars, the crash detection system 320 receives images of the signal strength icon when the signal strength at the mobile device is each of one bar, two bars, three bars, and four bars, as well as when the signal strength icon indicates that no network connection is available. If the mobile device modifies the signal strength icon when a telecommunications network is not available, the set of images received by the crash detection system 320 can further include the version of the signal strength icon that is displayed when the mobile device is unable to connect to the telecom network. Furthermore, the crash detection system 320 can receive one or more signal strength icon images from each of multiple different mobile devices, including different types of devices, devices produced by different manufacturers, and/or different models of devices. Each received image can be labeled to identify relevant information, such as the location of the signal strength icon within the image, a relative signal strength depicted by the signal strength icon (e.g., on a numerical scale from 1-4 or 1-5, or on a qualitative scale from "weak" to "strong"), and/or a timestamp indicating when each image was captured. The received signal strength icon images can be filtered or processed to prepare the data for training a machine learning model. For example, duplicate, unclear, or improperly cropped images can be removed, rotated or mirrored images can be corrected, or differences in brightness, contrast, or color can be normalized.

At block 604, the crash detection system 320 trains an image processing model using the received set of signal strength icon images. When trained, the image processing model is configured to receive a sequence of signal strength icon images as input and to output a prediction of whether a mobile device's modem has crashed based on analysis of the sequence of signal strength icon images through the model. For example, the model is configured to detect that the signal strength icon has progressed through a sequence of appearances that indicate that the modem was temporarily unable to detect a telecommunications signal in a manner that is indicative of a modem crash. The model can be trained to distinguish between the temporary unavailability of a network connection that is indicative of a silent crash, and other circumstances under which the mobile device cannot connect to a telecommunications network. For example, the model can be trained to distinguish silent crashes from circumstances where a cellular network is unavailable (e.g., because the mobile device moved into a geographic zone that is not covered by the network) or circumstances where other hardware or software issues on the mobile device caused an interruption to network communications. Such training can be achieved by periodically updating the training data set using new signal strength icon images and associated state data, such as signal strength data that indicates whether the network connection was temporarily lost.

The crash detection system 320 can train the image processing model using state data received from the mobile devices 310, in addition to the signal strength icon images. The state data includes any of a variety of types of data related to a context of the mobile device at the time of a purported crash, such as a cell tower identifier, signal strength measurements, current location of the mobile device (e.g., GPS coordinates), an identity of any active applications on the device, and/or whether the mobile device was moving at the time the communications processor crash was detected, as well as a speed and direction of movement if so. In some implementations, the state data is used to label the signal strength icon images in the training set. For example, state data that coincides with a sequence of signal strength icon images is processed by one or more machine learning models or rule-based models, or by human evaluators, to determine if the sequence of signal strength icon images captured a crash of a communications processor. According to the result of this analysis, the sequence is classified as corresponding to a crash or not corresponding to a crash. In other implementations, the image processing model is trained to receive state data as an input and predict communications processor crashes based in part on the received state data. For example, the image processing model represents two or more models, where a first model receives signal strength icon images as input, a second model receives state data as input, and a third model predicts whether a communications processor crashed based on the output of the first and second models.

At block 606, the crash detection system 320 provides the trained image processing model to one or more mobile devices to enable the devices to detect modem crashes during operation of the device. For example, as the mobile device operates, the mobile device captures images of signal strength icons and analyzes the images using the model trained by the crash detection system 320. Alternatively, the mobile device sends images to a system external to the mobile device (such as the crash detection system 320), which processes the images using the trained model. The crash detection system 320 receives state data from the mobile devices as the trained model is used by the mobile devices, which can be used to analyze modem crashes and continuously improve the crash detection models. This continual improvement can include, for example, periodically retraining the image processing model to better distinguish between actual modem crashes and other circumstances where an appearance of a signal strength icon changed— such as when the mobile device 310 is used in a moving vehicle. The image processing model can also be updated over time to better identify the signal strength icon, for example to account for new placement or new appearances of the signal strength icon on new devices. Updated versions of the image processing model can be periodically transmitted to each mobile device to enable the devices to use the improved model.

Detecting Communications Processor Crashes on a Mobile Telephonic Device

Figure 7:
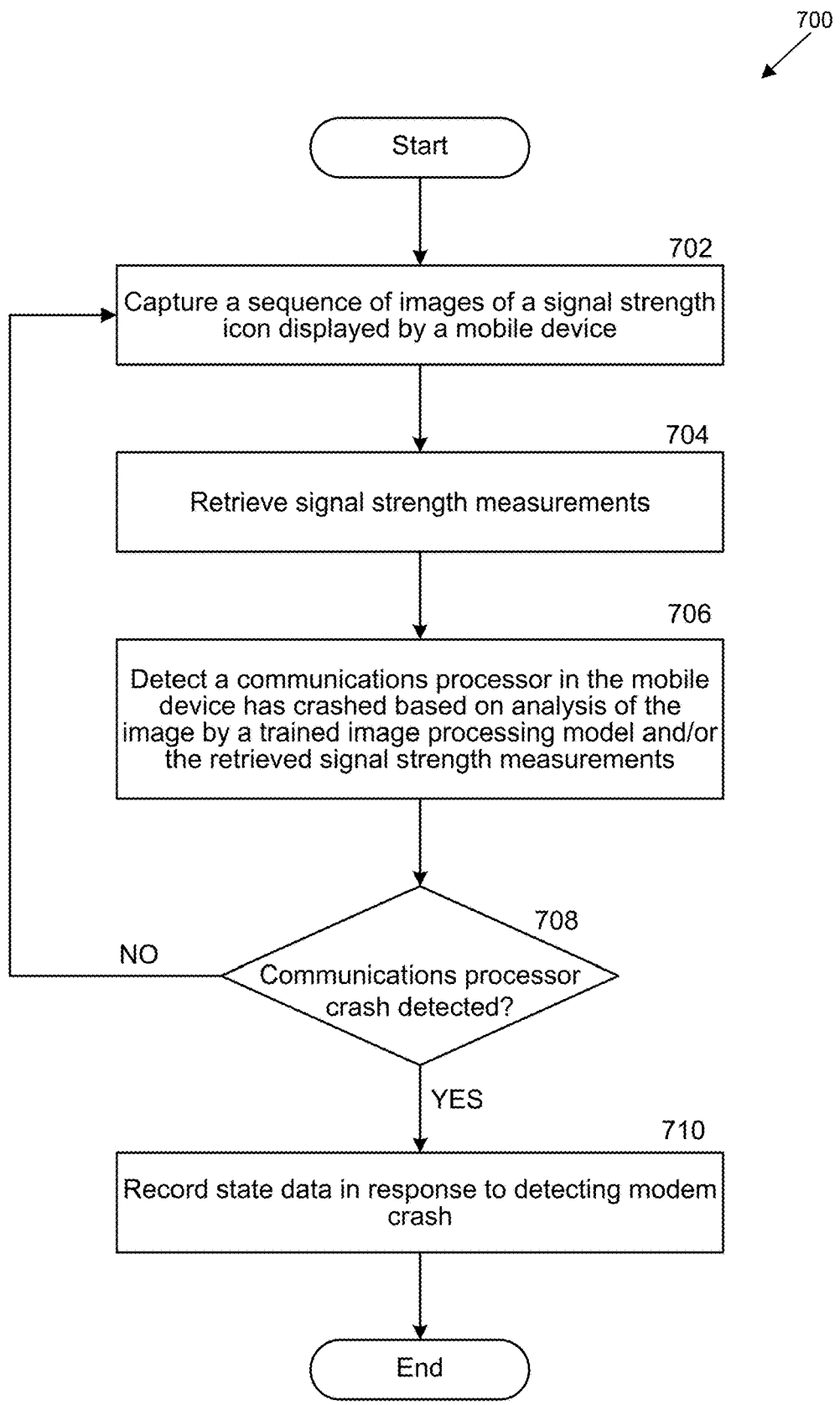
FIG. 7 is a flowchart that illustrates a process for detecting a crash of a communications processor on a mobile telephonic device.

FIG. 7 is a flowchart that illustrates a process 700 for detecting a crash of a communications processor on a mobile telephonic device. The process 700 can be performed by a mobile device, for example by an application processor that executes computer-readable instructions. Other implementations of the process 700 can include additional, fewer, or different steps, or can perform the steps in different orders.

At block 702, the mobile device captures a sequence of images of a signal strength icon displayed on a display device of the mobile device. The signal strength icon visually represents a signal strength of a telecommunication signal at the mobile device at a time each image in the sequence of images is captured. In some cases, the signal strength icon is displayed within a status bar (e.g., near a top of the display device), and the mobile device captures the images of the signal strength icon by capturing screenshots of the status bar. The mobile device can be caused the captured the sequence of images in response to detecting a chance in appearance of the signal strength icon. For example, an API used on the mobile device can generate a notification when a number of active bars in the signal strength icon changes. Upon detecting this notification, the mobile device can begin capturing screenshots of the signal strength icon for a predetermined period of time, such as thirty seconds. Additionally or alternatively, the mobile device captures images in the sequence of images at a periodic rate whenever the display device is active, whenever the mobile device is actively communicating over a cellular network, or under other specified circumstances.

At block 704, the mobile device retrieves signal strength measurements that indicate a strength of a telecommunications signal detected by the mobile device. For example, the mobile device periodically queries the signal strength measured at the mobile device using an application programming interface (API).

At block 706, the mobile device detects a communications processor (such as a modem) has crashed based on analysis of the sequence of images, the retrieved signal strength measurements, or both. The mobile device can analyze the sequence of images using a trained image processing model that is configured to output a prediction of the communications processor's crash based on the sequence of images.

If, at block 708, the mobile device determines the model predicted a communications processor crash, the mobile device records state data at block 710 that is associated with a context of the crash of the communications processor. The state data can be anonymized and transmitted to the crash detection system 320, where it is used with similar state data collected from other mobile devices to analyze or diagnose causes of silent modem crashes.

If the mobile device determines at block 708 that the communications processor likely did not crash, the process 700 returns to block 702 where the mobile device captures a subsequent sequence of signal strength icon images for analysis. The mobile device can continue monitoring the signal bar icon according to the process 700 to detect silent modem crashes whenever the device is in use.

Computer System

Figure 8:
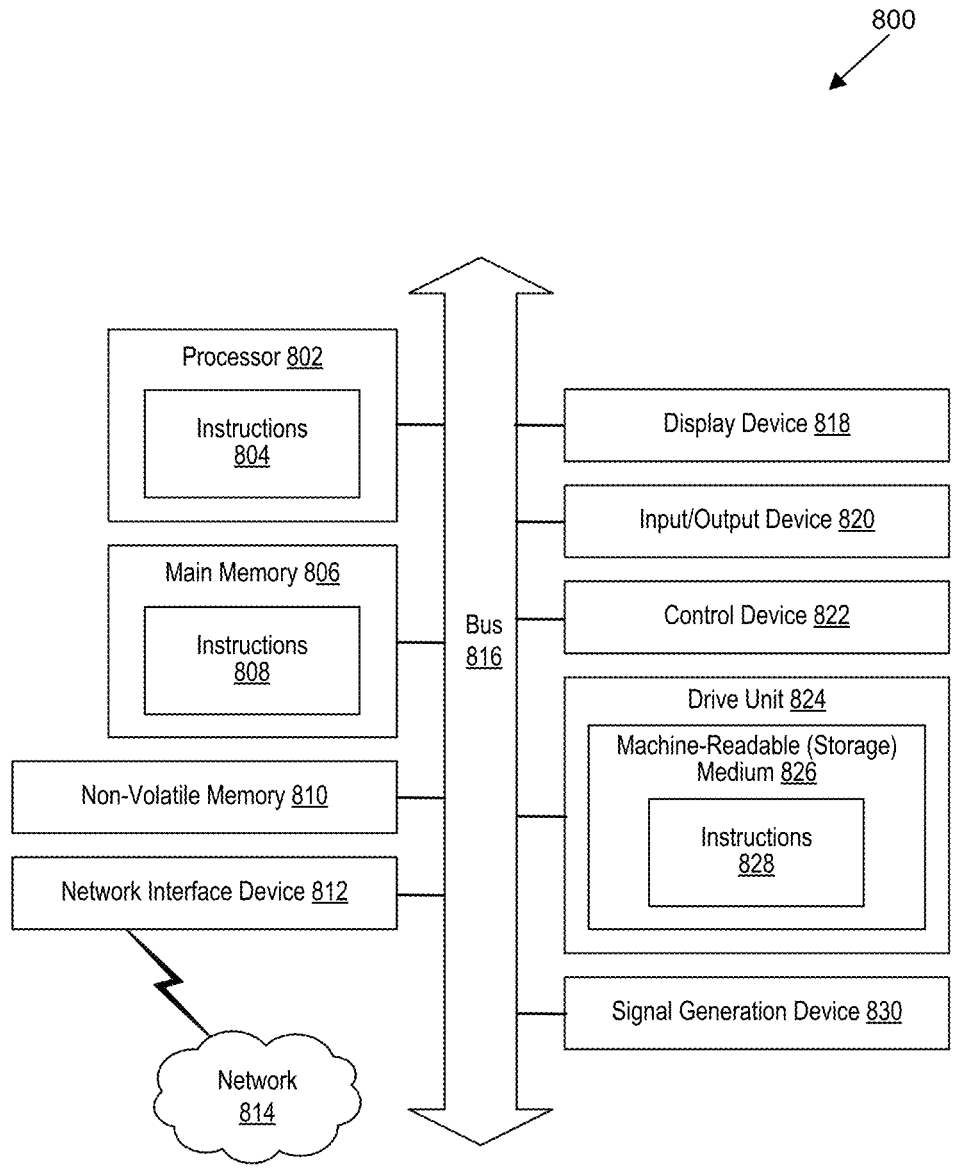
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A mobile telephonic device comprising:
   at least one display device;
   at least one modem;
   at least one application processor; and
   at least one non-transitory memory storing instructions, which, when executed by the at least one application processor, cause the mobile telephonic device to:
      capture a sequence of images of a signal strength icon displayed on the at least one display device, the signal strength icon visually representing a signal strength of a cellular network signal at the mobile telephonic device at a time each image in the sequence of images is captured;
      analyze the sequence of images of the signal strength icon using an image processing machine learning model that is trained to output a prediction of a crash of the at least one modem based on the sequence of images; and
      in response to the image processing machine learning model predicting the crash of the at least one modem, recording state data associated with a context of the crash of the at least one modem.

2. The mobile telephonic device of claim 1, wherein the signal strength icon is displayed within a status bar on the at least one display device, and wherein capturing the sequence of images of the signal strength icon comprises capturing screenshots of the status bar at each of multiple times.

3. The mobile telephonic device of claim 2, wherein analyzing the sequence of images of the signal strength icon comprises using the image processing machine learning model to identify the signal strength icon in each of the captured screenshots of the status bar.

4. The mobile telephonic device of claim 1,
   wherein the sequence of images of the signal strength icon comprises at least a first image of the signal strength icon captured at a first time and a second image of the signal strength icon captured at a second time different than the first time, and
   wherein analyzing the sequence of images of the signal strength icon comprises using the image processing machine learning model to detect a change in the signal strength icon between the first image and the second image.

5. The mobile telephonic device of claim 4, wherein the image processing machine learning model is configured to analyze the detected change in the signal strength icon and an amount of time between the first time and the second time.

6. The mobile telephonic device of claim 1, wherein the instructions cause the mobile telephonic device to capture the sequence of images of the signal strength icon in response to detecting a change in an appearance of the signal strength icon.

7. The mobile telephonic device of claim 1, wherein the instructions further cause the mobile telephonic device to:
   retrieve from the mobile telephonic device, a measurement of the signal strength of the cellular network signal at each of a plurality of times;
   analyze the measurements of the signal strength of the cellular network signal using a crash detection model that is trained to output a probability of the crash of the at least one modem based on the measurements of the signal strength of the cellular network signal; and
   in response to the crash detection model predicting the crash of the at least one modem, recording the state data associated with the context of the crash of the at least one modem.

8. The mobile telephonic device of claim 1, wherein the signal strength icon visually represents the signal strength by displaying a number of bars that is selected based on the signal strength.

9. The mobile telephonic device of claim 1, wherein the state data includes one or more of a cellular tower identifier, a signal strength measurement, a current location of the mobile telephonic device, an identity of an active application on the mobile telephonic device, or an identification of whether the mobile telephonic device is moving.

10. At least one computer-readable storage medium, excluding transitory signals and carrying instructions, which, when executed by at least one data processor of a system, cause the system to:
    capture a sequence of images of a signal strength icon displayed on a display device of the system, the signal strength icon visually representing a signal strength of a telecommunications network signal at the system at a time each image in the sequence of images is captured;
    analyze the sequence of images of the signal strength icon using an image processing model that is trained to output a prediction of a crash of a communications processor in the system based on the sequence of images; and
    in response to the image processing model predicting the crash of the communications processor, recording state data associated with a context of the crash of the communications processor.

11. The at least one computer-readable storage medium of claim 10, wherein the signal strength icon is displayed within a status bar on the display device, and wherein capturing the sequence of images of the signal strength icon comprises capturing images of the status bar at each of multiple times.

12. The at least one computer-readable storage medium of claim 11, wherein analyzing the sequence of images of the signal strength icon comprises using the image processing model to identify the signal strength icon in each of the captured images of the status bar.

13. The at least one computer-readable storage medium of claim 10, wherein the sequence of images of the signal strength icon comprises at least a first image of the signal strength icon captured at a first time and a second image of the signal strength icon captured at a second time different than the first time, and wherein analyzing the sequence of images of the signal strength icon comprises using the image processing model to detect a change in the signal strength icon between the first image and the second image.

14. The at least one computer-readable storage medium of claim 10, wherein the instructions cause the system to capture the sequence of images of the signal strength icon in response to detecting a change in an appearance of the signal strength icon.

15. The at least one computer-readable storage medium of claim 10, wherein the instructions further cause the system to:
    retrieve a measurement of the signal strength of the telecommunications network signal at each of a plurality of times;
    analyze the measurements of the signal strength of the telecommunications network signal using a crash detection model that is trained to output a probability of the crash of the communications processor based on the measurements of the signal strength of the telecommunications signal; and in response to the crash detection model predicting the crash of the communications processor, recording the state data associated with the context of the crash of the communications processor.

16. At least one computer-readable storage medium, excluding transitory signals and carrying instructions, which, when executed by at least one data processor of a system, cause the system to:

receive a set of signal strength icon images captured from a plurality of mobile telephonic devices,
- wherein each signal strength icon image is a visual representation of a signal strength of a telecommunications signal at a time the signal strength icon image was captured, and
- wherein the set of signal strength icon images includes signal strength icon images representing multiple signal strengths at each of multiple types of the mobile telephonic devices;

train an image processing model, using the set of signal strength icon images, to predict a crash of a communications processor based on a sequence of signal strength icon images; and provide the trained image processing model for use by an identified mobile telephonic device to detect a crash of a communications processor in the identified mobile telephonic device using signal strength icon images displayed by the identified mobile telephonic device.

17. The at least one computer-readable storage medium of claim 16, wherein the instructions further cause the system to:

receive state data from the plurality of mobile telephonic devices that correspond in time to at least a subset of the signal strength icon images in the set of signal strength icon images;

wherein the image processing model is further trained based on the received state data.

18. The at least one computer-readable storage medium of claim 17, wherein training the image processing model further based on the received state data comprises:

training a crash detection model using the received state data, the crash detection model when trained configured to input state data and output a prediction of a communications processor crash based on the input state data; and using a comparison between the prediction output by the trained crash detection model and the prediction output by the trained image processing model to retrain the trained image processing model.

19. The at least one computer-readable storage medium of claim 16, wherein the instructions further cause the system to:

receive from the identified mobile device, one or more signal strength icon images that when processed by the trained image processing model caused the identified mobile device to detect the crash of the communications processor in the identified mobile device;

receive context data that corresponds in time to the one or more signal strength icon images;

process the context data to determine if the trained image processing model accurately predicted the crash of the communications processor when applied to the one or more signal strength icon images;

if the trained image processing model did not accurately predict the crash of the communications processor, retrain the image processing model using the one or more signal strength icon images and the context data.

20. The at least one computer-readable storage medium of claim 16, wherein training the image processing model further comprises training the image processing model to identify a signal strength icon in a captured image of a status bar displayed on the identified mobile telephonic device.

* * * * *